United States Patent [19]

Kohashi

[11] Patent Number: 4,833,530
[45] Date of Patent: May 23, 1989

[54] METHOD AND APPARATUS FOR PRINTING INK BY DISSOLVING COLORANT WITH SOLVENT DEPOSITED ON A DRUM

[75] Inventor: Tadao Kohashi, Osaka, Japan

[73] Assignee: Matsushita Electric Industrial Co., Ltd., Japan

[21] Appl. No.: 112,033

[22] Filed: Dec. 8, 1987

Related U.S. Application Data

[62] Division of Ser. No. 616,835, Jun. 4, 1984, Pat. No. 4,731,647.

[30] Foreign Application Priority Data

Jun. 3, 1983 [JP] Japan .................................. 58-99738
Mar. 23, 1984 [JP] Japan .................................. 59-56655

[51] Int. Cl.⁴ .............................................. H04N 1/46
[52] U.S. Cl. .................................. 358/75; 346/140 N
[58] Field of Search ................ 358/75, 296; 101/468, 101/472, DIG.2; 346/75, 140 R

[56] References Cited

U.S. PATENT DOCUMENTS

| | | | |
|---|---|---|---|
| 2,428,945 | 10/1947 | Singer | 358/75 |
| 2,616,961 | 11/1952 | Groak | 358/75 |
| 3,780,214 | 12/1973 | Bestenreiner et al. | 358/75 |
| 4,161,749 | 7/1979 | Erlichman | 358/75 |
| 4,293,866 | 10/1981 | Takita et al. | 346/75 |
| 4,731,647 | 3/1988 | Kohashi | 358/75 |

Primary Examiner—James J. Groody
Assistant Examiner—Robert M. Bauer
Attorney, Agent, or Firm—Lowe, Price, LeBlanc, Becker & Shur

[57] ABSTRACT

A layer of fresh colorant is deposited on a first drum. Solvent is selectively deposited on a second drum in contact with the colorant layer in response to an electrical signal representing the density of a picture element. The colorant layer is subsequently brought into contact with first the solvent on the second drum and then with a recording medium to transfer the portion of the colorant layer which contacts the solvent to the recording medium.

4 Claims, 11 Drawing Sheets

METHOD AND APPARATUS FOR PRINTING INK BY DISSOLVING COLORANT WITH SOLVENT DEPOSITED ON A DRUM

This is a division of application Ser. No. 616,835, filed 6/4/84, now U.S. Pat. No. 4,731,647.

BACKGROUND OF THE INVENTION

The present invention relates to a method and apparatus for printing ink on a recording medium.

Conventional ink printers make use of ink which comprises a dye or pigment dispersed in a solvent. Due to the drying of solvent, the viscosity of ink tends to increase with a resultant decrease in operating performance. If the printer is left to stand still, the nozzle openings are clogged by the coloring agent. The printer must receive frequent services to keep the nozzle openings clean. Because of the clogging problem, limitations are imposed on the types of material to be used for the dye and on the amount of the dye to be mixed with the solvent. The printer's sensistivity to clogging further prevents the use of binders which increase the luster and the light-proof characteristic of printed images. In addition, for multi-color or full-color printing, individual recording heads must be provided for the different colors. This add to the complexity of the printer.

SUMMARY OF THE INVENTION

Accordingly, the primary object of the present invention is to eliminate the above noted problems of the prior art.

This object is obtained by separating the constituents of ink into solvent and colorant and providing the latter on a transfer base and depositing the former in the form of a droplet on the colorant to dissolve it into a state transferable from the base to the recording medium.

By the separation of the two constituents of the ink, the recording head no longer suffers from the clogging problem, dyestuff can be chosen from among a wide range of materials, and binders can be added to the colorant to improve luster and light-proof performance.

According to a feature of the present invention, the method of printing ink comprises providing a transfer base and a layer of colorant deposited thereon, and selectively depositing a solvent on a portion of the colorant layer or a recording medium in response to an electrical signal representing the density of a picture element. The colorant layer is subsequently brought into contact with the recording medium to transfer the portion of the colorant layer from the base to the recording medium.

According to a further feature of the invention, an apparatus for printing ink on a recording medium comprises transfer means having a base and a layer of colorant deposited thereon, means for movably supporting the transfer means, and means for depositing a solvent on a portion of one of the colorant layer and the recording medium in response to an electrical signal representing the density of a picture element. Further provided is a means for feeding the recording medium in nonslidable pressure contact with the colorant layer and transferring the portion of the colorant layer from the base to the recording medium.

BRIEF DESCRIPTION OF THE DRAWINGS

The present invention will be described in further detail with reference to the accompanying drawings, in which.

DETAILED DESCRIPTION

Figure 1:
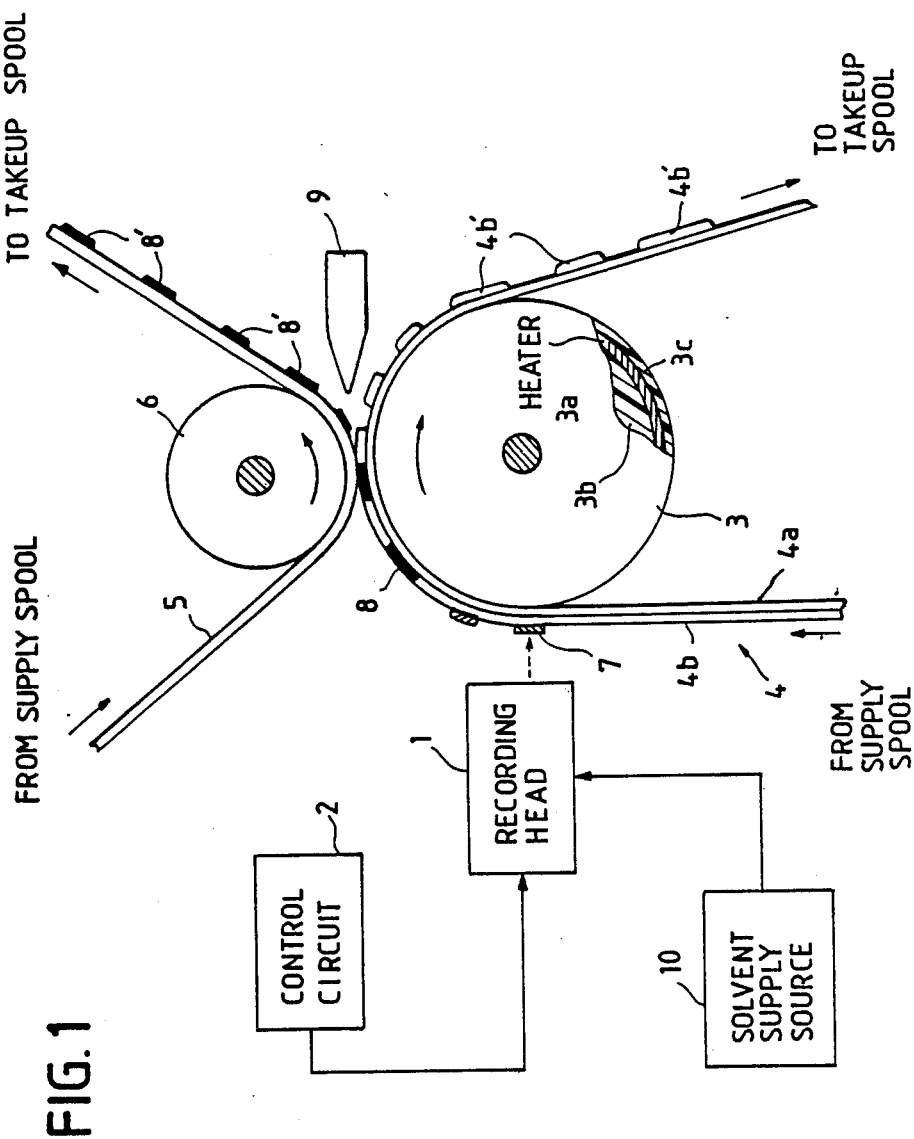
FIG. 1 is an illustration of a first embodiment of the present invention in which solvent is deposited on a colorant layer.

In FIG. 1, there is shown an embodiment of the present invention. Liquid is supplied from a solvent supply source 10 to a liquid applying unit, or recording head 1 which is responsive to a modulation signal from a control circuit 2 to apply to a liquid droplet 7 to a writing surface. In this embodiment, the writing surface is presented by a colorant transfer sheet 4 looped around a cylinder 3 which turns clockwise as transfer sheet 4 is transported in a direction from a supply spool to a takeup spool, not shown. The colorant transfer sheet 4 comprises a base 4a of plastic or paper which is coated with a layer 4b of solid-phase colorant. The transfer sheet 4 is in pressure contact with the surface of a recording sheet 5 of paper which is wound on a rubber-coated cylinder 6 and transported from a supply spool to a takeup spool, not shown.

As will be described in detail later, the liquid supplied to the recording head 1 is a solvent capable of dissolving the solid-phase colorant into a liquid-phase in which the dissolved colorant can be transferred from the transfer sheet 4 to the recording medium.

The cylinder 3 includes a resistance heating element 3a wound on an insulative body 3b and a heat resistive rubber 3c covering the heating element 3a.

The solvent 7 is deposited on the surface of the colorant layer 4b to dissolve portions 8 of the layer 4b as the cylinder 3 rotates clockwise into a transferable state before contact with the recording sheet 5. The dissolved colorant 8 is transferred from the base 4a to the recording sheet 5 upon pressure contact therewith, depositing colorant as shown at 8' on recording sheet 5 and leaving undissolved portions 4b' on the base 4a.

The deposited solvent is heated by the heater 3a at a constant temperature. This not only accelerates the dissolving process to make possible high speed printing but also stabilizes the transfer characteristic of the dissolved colorant against varying ambient temperatures. For this purpose, the heater 3a is controlled by a heat control source, not shown, to keep the surface temperature of the cylinder at a constant level. However, this temperature is is much lower than the temperature at which the colorant voluntarily becomes transferable to the recording sheet. A separator 9 is preferably provided to forcibly separate the sheets 4 and 5 which have a tendency to stick to one another.

It is found that the dissolution of at least one constituent of the colorant material is sufficient to cause the entire colorant to be transferred. Thus, the solvent is required to be of a material capable of dissolving at least one such constituent of the colorant.

Figure 2:
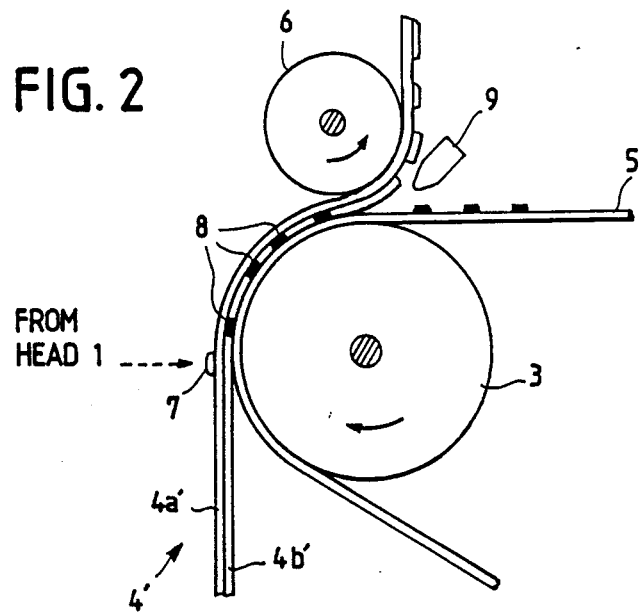
FIG. 2 is an illustration of a second embodiment of the invention in which solvent is deposited on a porous transfer base.

In FIG. 2, the writing surface is presented by the transfer sheet as in FIG. 1, but differs therefrom in that the transfer sheet 4' comprises a porous base 4a' which is impregnated with a colorant layer 4b' and the solvent is deposited on the transfer base 4a'. The colorant layer 4b' is in contact with recording sheet 5 which is wound on the cylinder 3. The transfer sheet 4' is transported between cylinder 6 and cylinder 3. The porous base 4a' has pores extending between the opposite surfaces thereof. Solvent 7 deposited on the porous base 4a' permeates without dispersion to dissolve colorant portions 8 which are transferred to the recording sheet 5. One suitable material for the porous base 4a' is paper formed of Manila hemp tissue of the type used in known electrolytic capacitors. This type of porous base can be employed in the present invention regardless of the type of solvent used. The thickness of the base 4a' is typically in the range between 20 and 30 micrometers.

Figure 3A:
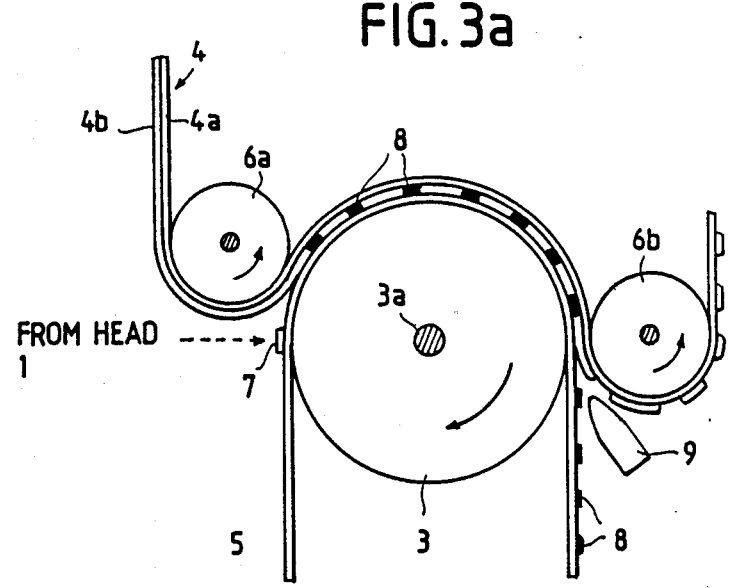
FIG. 3a is an illustration of a third embodiment of the invention in which solvent is deposited on a recording medium.

In FIG. 3a, the writing surface is presented by the recording sheet 5 which is wound on the cylinder 3. The transfer sheet 4 is supported between two cylinders 6a and 6b which are spaced apart to provide an area of contact between the transfer sheet 4 and recording sheet 5 and is urged toward the rotary shaft 3a of cylinder 3 by suitable biasing means, not shown. Preferably, the takeup-side cylinder 6b is driven at a speed slightly higher than the speed of rotation of the supply-side cylinder 6a to stretch the portion of the transfer sheet 4 that is supported by cylinders 6a, 6b tighter than is the corresponding portion of the recording sheet 5. This improves the transfer efficiency of the dissolved colorant.

The solvent droplet 7 is deposited on the recording sheet 5 in a position adjacent to the supply-side cylinder 6a so that the deposited solvent does dry before it contacts the colorant layer 4b. During the time when the cylinder 3 rotates through an arc defined between the cylinders 6a and 6b, colorant 4b is dissolved as shown at 8 by heat and pressure to provide a record of colorant 8' on recording sheet 5.

Figure 3B:
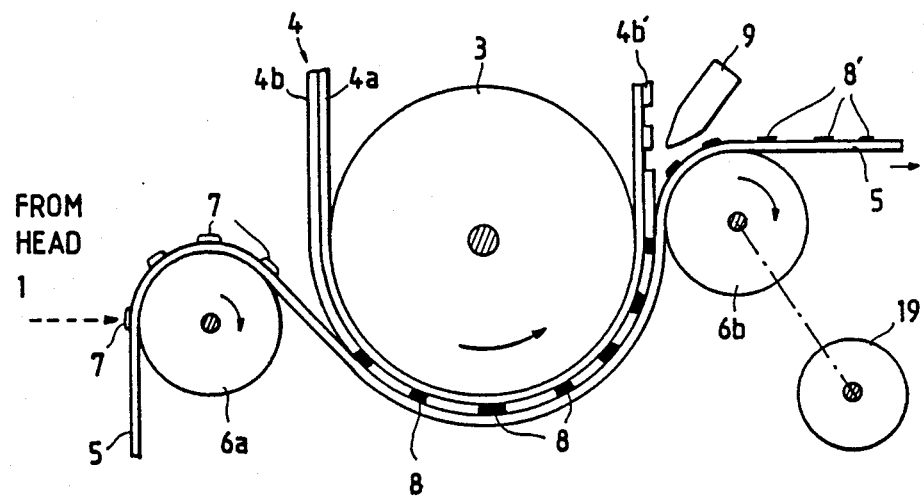
FIG. 3b is a modification of the third embodiment which is particularly useful for electroosmotic printers.

In FIG. 3b, the writing surface is also presented by the recording sheet 5 which is supported between cylinders 6a and 6b to establish a pressure with the colorant layer 4b of transfer sheet 4 which is wound on cylinder 3. The supply-side cylinder 6a is spaced from the cylinder 3. This arrangement is advantageous for a recording head of the type whose nozzle opening or openings are in contact with the writing surface in that it isolates the thermal energy generated by the heating element 3a from the recording head and prevents it from becoming unstable in writing performance.

Figure 4:
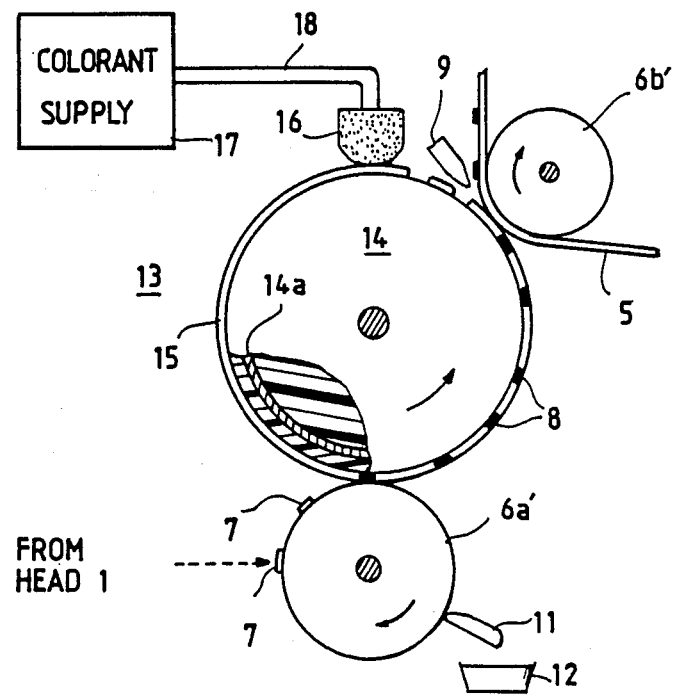
FIG. 4 is an illustration of a fourth embodiment of the invention in which solvent is deposited on a transfer drum.

FIG. 4 is an illustration of a modified embodiment of the invention in which a transfer drum arrangement 13 is employed instead of the transfer sheet 4. The transfer drum arrangement includes a transfer drum 14 having a rubber or metal coating thereon, and a layer 15 of colorant having a quick dry characteristic. Depending on the type of colorant material used, the colorant may contain water-soluble liquid (water, alcohol) or water-insoluble liquid (toluene, xylene, in the form of a dissolution or suspension to cause at least one constituent of the colorant to be dissolved by the solvent. This colorant layer is applied by means of a sponge 16 which is impregnated with the quick dry colorant supplied from a container 17 through a conduit 18. Preferably, heated air is directed to the surface of the drum 14 to accelerate the drying of the liquid colorant: Alternatively, the transfer drum 14 includes a resistance heater 14a in a manner identical to that shown in FIG. 1 to heat the surface of the drum to the dissolution transferable temperature which is mentioned previously in connection the FIG. 1 embodiment. Solvent 7 is deposited directly on the surface of a cylinder 6a' which rotates in clockwise direction in contact with the dried colorant layer 15 to dissolve colorant portions 8 which are in turn brought into pressure contact with the recording sheet 5 which is rolled on a cylinder 6b'. The contact surface area can be increased to improve the transfer performance by the provision of an additional cylinder between cylinders 6a' and 6b' for supporting the recording sheet 5 between the cylinder 6b' and the additional cylinder in a manner similar to those shown in FIGS. 3a and 3b. This embodiment eliminates the use of the transfer base sheet of the previous embodiments which would otherwise be wasted. A scraper 11 is in contact with the surface of the cylinder 6a' to scrape off the remnant of the solvent into a receptacle 12. In an alternative embodiment, the transfer drum is replaced with a transfer sheet in endless form supported between two cylinders in contact with the sponge 16.

The following description is concerned with materials used in the present invention. The colorant is composed of a material containing a dye, or a dispersion of a dye in a binder, a dispersion of a pigment in a binder, or a dispersion of a mixture of a dyestuff and a pigment in a binder, with or without a surfactant, plasticizer or any other auxiliary materials. While it is desirable that the dyestuff and binder be dissolvable by the solvent employed, a satisfactory result could be obtained by a colorant composed of at least one constituent which is dissolvable by the solvent since this dissolution allows the whole entire colorant to be transferred to the recording sheet. If the solvent is soluble with water, the dyestuff must be acidic or basic, and if it is insoluble with water, solvent dye is used as the dyestuff. The pigment may be either organic or inorganic. Materials suitable for the binder include those used in any coating material or ink used in offset printing and photogravure. In the embodiments of FIGS. 1, 2, 3a and, 3b where the colorant is applied on a sheet form of a base material, the solvent should be of the reversible material. For embodiments in which water-soluble solvents are used, suitable materials for the binder include alkyd resins, epoxyether, acryl resins and melamine resins. In the case of water-insoluble solvents, suitable materials for reversibly dissolvable binders are solid natural resins, nitrocellulose, cellulose acetate, polyamid, plystylol resins.

Suitable materials for the transfer sheet base include plastic film, cellulose or plastic fiber based paper with a thickness of 12 to 50 micrometers in the form of a roll or loop. These materials are required to have a lower degree of affinity to dissolve colorant than the degree of affinity exhibited by the recording sheet. This requirement is met by choosing an adhesive material whose bonding power to the base material is smaller than it is to the recording sheet. In the embodiment of FIG. 2 where a porous base material is used, the colorant or binder should be of a material that exhibits small adhesiveness to the porous base. A further requirement is that the base material be resistant to the solvent and this requirement can be met simultaneously with the affinity requirement just mentioned.

It is found that the thickness of the colorant layer is preferably in the range between 1 and 15 micrometers. For halftone or color printing applications, suitable materials for the colorant are those composed exclusively of a dye or a dispersion of a dye and a binder which are both dissolvable by the solvent used. If it is required that the colorant be immune to varying ambient conditions, the preferred colorant is of a material containing a pigment suspended in a binder, or a mixture of dye and pigment suspended in a binder with a weight ratio in the range between 1:25 and 1:1.

For the recording sheet, plastic films and paper used in conventional recording and printing applications can be employed. For multi-color or full-color printing, application of a layer of calcium carbonate on an uncoated paper sheet with a density of 20 grams per 1 $m^2$ has given a satisfactory result to improve the affinity to dissolved colorant. For this reason, the preferred recording sheet includes mat-coated paper and dull-coated paper having a luster (Tappi) in the range between 0 and 15.

Figure 5:
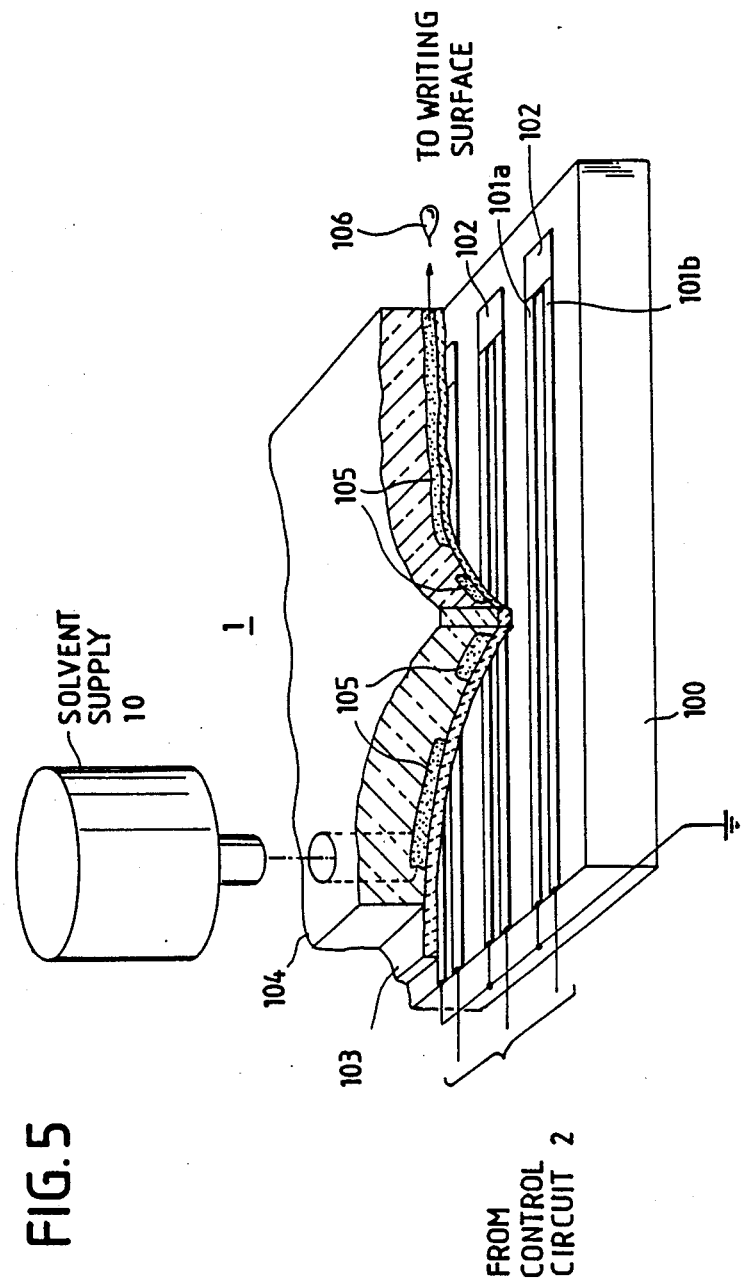
FIG. 5 is an illustration of a recording head useful for the present invention.

FIG. 5 is an illustration of an example of the recording head 1 useful for the present invention. The head comprises a base 100 which extends across the width of the recording sheet. On the surface of the base 100 is formed a linear array of electrodes 101a and 101b in pairs extending from the rear edge of the base to a point near the front edge which is spaced a small distance from a writing surface. Across the front end of each electrode pair is connected a resistance heating element 102 to form an array of such heating elements 102 with a density of 4 to 8 per millimeter. An insulative thin film 103 of silicon oxide is laid over the base to insulate an overlying glass plate 104 from the electrodes 101a, 101b. An array of grooves 105 is formed under the bottom surface of the glass plate 104 in one-to-one correspondence with the underlying electrode pairs. The grooves are connected at their ends to a common passageway which is in turn connected to the solvent supply source 10 and extend to the front edge to define an array of nozzle openings thereat. The groove 105 measures 50 to 70 micrometers in depth and width.

Solvent is supplied by capillary action to each groove and fills to the front edge. The electrodes 101a are coupled together to ground and the other electrodes 101b are connected to the control circuit 2 to heat the individual heating elements in response to a video signal.

A temperature rise in a given heating element causes the portion of solvent directly above it to vaporize, creating a bubble which pushes the front portion of the liquid solvent under high pressure, ejecting a droplet 106 through the nozzle opening at a high speed to the writing surface. The recording head of this type allows a variety of choices in the selection of solvent materials and as a result a wide range of colorant materials can be employed.

Figure 6:
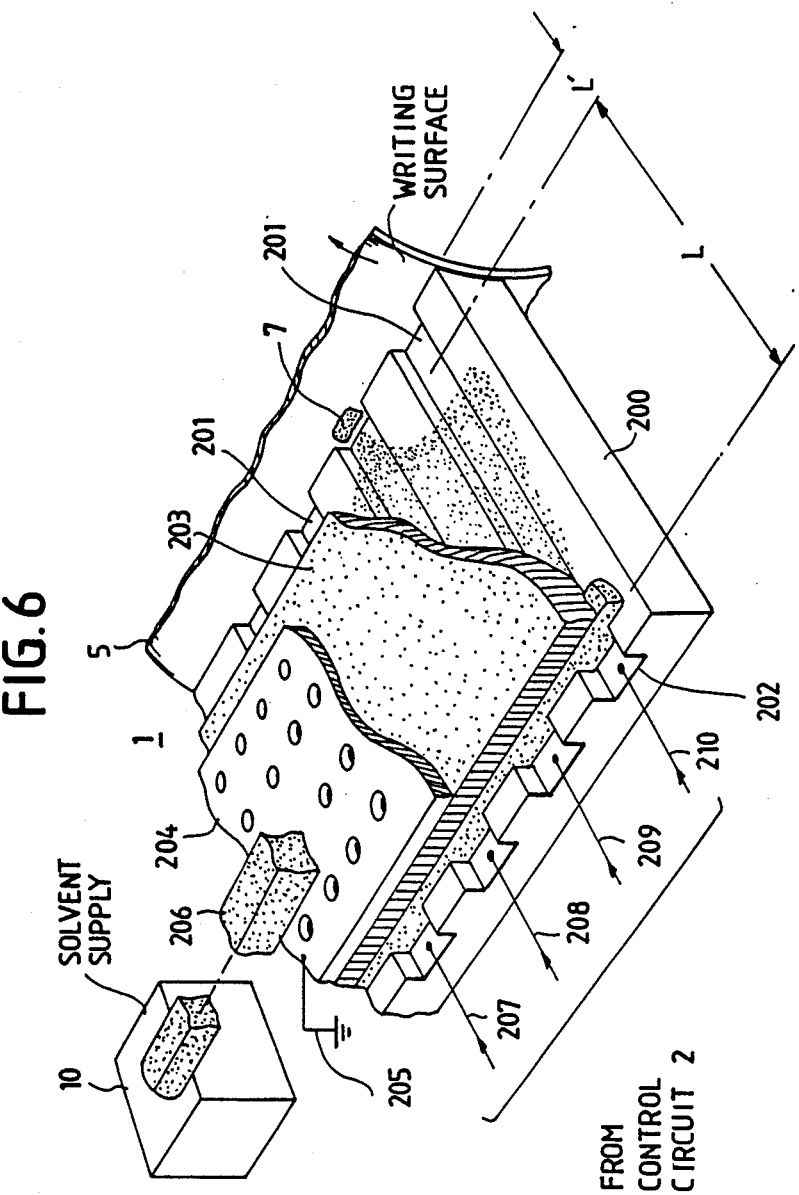
FIG. 6 is an illustration of an electroosmotic printer head particularly useful of the present invention.

FIG. 6 shows a second example of the recording head which is advantageously employed in the embodiments of FIGS. 3a and 3b for recording halftone images. This recording head comprises a dielectric base 200 formed of sodalite or borosilicate glass having a thickness of 1.5 to 3 millimeters. The base 200 extends across the width of the recording sheet and is formed with an array of grooves 201 extending from the rear to the front edge of the base to define an array of nozzle openings at the front edge, which is in contact with the writing surface to deposit solvent droplets thereon under electroosmotic force. The grooves 201 are spaced apart a distance of 125 micrometers and each have a width of 50 to 70 micrometers and a depth of 15 to 30 micrometers. The inner walls of the grooves 201 are coated with layers of vacuum deposited chromium and gold having thickness of 0.2 and 1.5 micrometers, respectively, to form an array of grooved electrodes 202 which are coupled at rear ends to the control circuit 2.

On the dielectric base 200 is a porous member 203 having pores extending across the opposite surfaces thereof to allow liquid solvent to permeate downward into the grooves 201. A suitable material for the porous member is a microporous membrane filter formed of a mixed ether of cellulose nitrate and cellulose acetate, or formed of cellulose acetate. The porous member has an average pore diameter of 0.1 to 10 micrometers, a thickness of 80 to 100 micrometers and a porosity in the range between 60% to 80%. Along the rear edge of the porous member 203 is a flexible filling member which blocks the rear end of each groove to prevent leakage of fluid. The front edge of the porous member 203 is spaced inwardly from the front edge of the base 200 to define a rear working area (L) in which the liquid is modulated under electroosmotic force and a front working area (L') in which the liquid is caused to converge to a desired nozzle opening.

On the porous member 203 is a mesh electrode 204 formed of phosphor bronze having a thickness of 50 to 100 micrometers and 100 to 200 mesh, the electrode 204 being grounded as at 205. Liquid solvent is supplied from the source 10 through a sponge conduit 206 and mesh electrode 204 to the porous member 203. Upon the application of a positive-going pulse to leads 207, 208 and 210 and a negative-going pulse to lead 209, the fluids in the positively biased grooves are electroosmotically displaced rearward, while the fluid in the negatively biased groove is electroosmotically displaced forward at a speed which is greater than the speed of liquid displacement in the porous member 203 by a factor L/d, where d represents the depth of the grooves 201. The amount of the fluid displaced in the rear working area is proportional to the duration of the negative-going pulse which is modulated in accordance with the video signal. In the front working area of the base, electroosmotic action exerts force on either side of the negatively biased groove in opposite directions under the electric field proportional to a potential difference between grooves and inversely proportional to $P(1-a)$, where P is the spacing between adjacent grooves and P x a equals the width of the groove.

Under the influence of this field the forwardly displaced solvent collects in the nozzle opening of the negatively biased groove to deposit the solvent as shown at 7. The video signal is applied to alternately arranged electrodes on a time-shared fashion.

Suitable solvent for the recording head of FIG. 6 is a mixture of haloganated paraffins, preferably chlorinated paraffins such as n-octyl chloride with 0.1 to 10 wt % of a charge controlling agent such as a polyoxyethylene alkyl-phenol ether whose alkyl moiety is represented by $C_nH_{2n+1}$-wherein $8<n<12$ and which has an HLB value ranging from about 5 to 18.

Suitable material for the transfer sheet base 4a in the arrangement of FIG. 3b in combination with the head of FIG. 6 is high-density paper such as plastic paper, condenser paper or glassine paper having an insoluble layer with a thickness of 12 to 50 micrometers. Preferably, the base material best suited for the solvent just mentioned above is an orthogonally extended film such as polyvinyl alcohol, polypropylene, cellophane or polyethylene terephthalate. A thin coat of polyvinylidene chloride may be applied on such films as necessary. Use is preferably made of oil-soluble dyestuff, or organic or inorganic pigment for the colorant.

Use is further preferably made of a binding material which is reciprocally dissolvable by the above-mentioned solvent. This binding material is 100% phenolic resin, phenolic resin modified by natural resin, maleic resin modified by natural resin, pentaerythritol resin modified by natural resin, petroleum resin, or polystyrol resin.

For multi-color or full-color printing, care should be taken in determining the binding material and dyestuff to ensure that the electroosmotic mobility of the solvent in the recording head is not adversely affected even if it is mixed with such materials since such mixture is likely to occur in the case of the contact type recording head. For chrolinated paraffin solvent, it is desirable to use dis-azo dye such as C. I. Solvent Black 3 (C. I. Constitution 26125) as a black dye, mono-azo dye such as C. I. Solvent Yellow 16 (C. I. Constitution 12700) as yellow dye, xanthene dye such as C. I. Solvent Red 49 (C. I. Constitution 45170 : 1) as a magenta dye, and phthalocyanine dye such as C. I. Solvent Blue 25 (C. I. Constitution 74350) as a cyan dye. In that instance a preferred binder includes Nisseki Neopolymer 120 (petroleum resin manufactured by Nihon Sekiyu Kagaku Kabushiki Kaisha), Beccasite F-266 (maleic resin modified by natural resin manufactured by Dai-Nippon Ink Kagaku Kabushi Kaisha). These binding materials are rapidly dissolvable by the above-mentioned haloganated paraffin solvent. For this purpose, a colorant transfer sheet can be appropriately prepared by dissolving the above-mentioned dye with alcohol or toluene or the like and applying the dissolved dye on a base of the type mentioned above, or mixing the above-mentioned binder with the above-noted dye and dissolving the mixture with toluene or xylene and applying the dissolved mixture on a base. The layer of such colorant has a thickness of 2 to 10 micrometers after cure. It is shown that the colorant so prepared was dissolved in a period less than 1 second with the above-mentioned chlorinated paraffin solvent and successfully transferred to a recording sheet. A rapidly dissovable colorant of the above-noted pigment-binder type can be prepared by the use of carbon black pigment which is typically used in photogravure, soluble azo yellow pigment, soluble or insoluble magenta pigment, or phthalocyanine pigment.

For multi-color or full-color printing, the recording sheet preferably comprises mat-coated paper having an 80-micrometer thick coat of calcium carbonate. In that instance, the colorant is preferably a dispersion of a dye in a binder.

Figure 7:
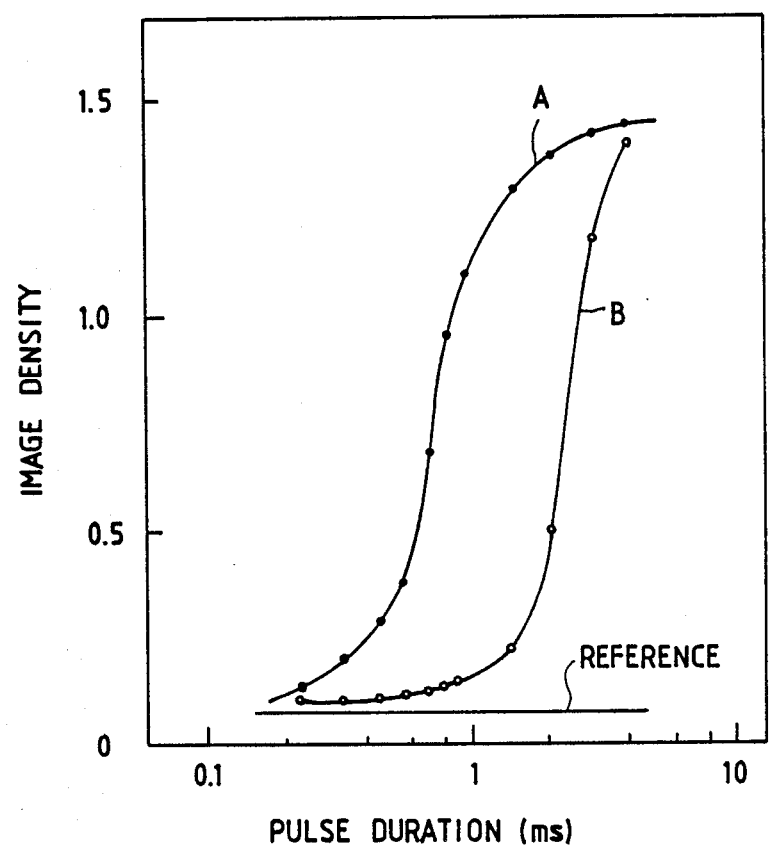
FIG. 7 is a graphic illustration of the operating performance of the invention.

An experiment was conducted to evaluate the operating performance of the embodiment of FIG. 3b in combination with the recording head of FIG. 6. FIG. 7 is a plot of a curve A of the present invention which describes the relationship between the density of the colorant deposited on the recording sheet and the duration of the pulse applied to a given electrode of the recording head. Curve B is a plot which was obtained with the recording head of FIG. 6 using the conventional colored ink. In this experiment, the porous member 203 was formed of a membrane filter composed of a mixture of cellulose nitrate and cellulose acetate having a thickness of 120 micrometers and an average pore diameter of 3 micrometers. The grooves 201 had a depth of about 20 micrometers and a length of about 20 millimeters and was spaced at intervals of 125 micrometers. The length of the rear working area L was about 20 millimeters and the front working area L' measured about 100 micrometers.

Curve A was obtained with the use of a solvent which is composed of n-octyl chloride with 0.4 wt % of a polyoxyethylene nonylphenol ether having an HLB value of 14.1. Mat-coated paper was used as the image recording medium. The transfer sheet was a transparent, orthogonally extended polyvinyl alcohol film having a thickness of 25 micrometers. The colorant layer was composed of a mixture of a petroleum resin (Nisseki Neopolymer 120) and 25 wt % of C. I. Solvent Black 3 and was applied to a thickness of 7 micrometers of the transfer sheet base.

The electrical signal applied to the active electrodes of the recording head was a 250-volt negative-going pulse of which the duration was modulated with a video signal (with a maximum pulse duration of 5 milliseconds) and the signal applied to the inactive electrodes was a 100-volt positive potential. The arrangement was such that the video signal was stored in a line memory which was halved into two sections and the signals stored in these memory sections were alternately converted at intervals of 5 milliseconds to the negative-going pulse mentioned above and applied to the active electrodes while the other electrodes are maintained at the positive potential. The recording speed was 10 milliseconds per line and the recording density was 8 lines per millimeter.

Curve B was obtained with the use of an ink which is a mixture of the solvent identical to that mentioned above and 5 wt % of C. I. Solvent black 3. This ink was suplied to the recording head and applied directly to the same recording sheet. The same recording head and the same manner of operation were employed in plotting the curve B.

As is seen from FIG. 7, the image density in curve B rapidly increases in response to the pulse duration exceeding a 1-millisecond value, whereas the image density in curve A increases gradually in a wider range of pulse durations. More specifically, the lower threshold of the pulse duration was reduced to one-third of the current value. This means that the sensitivity of the printer is increased by a factor of 3 in comparison with the current printer and that halftone image recording is made possible.

According to further advantageous features of the present invention, the printer is immune to the deterioration of electroosmotic performance which would otherwise be caused by the mixed colorant and the resultant reduction in recording speed and is further immune to the limitations of the dye-to-solvent mixture ratio. The immunity to such limitations allows a high density image recording not attainable with the prior art.

In prior art color printing, the absence of binders in colored ink imposed limitations on the light-proof characteristic, so that its performance is equivalent to the first grade on the blue scale. The present invention, on the other hand, showed a light-proof performance substantially equivalent to the fourth grade on the blue scale with the use of a colorant containing one of the dyes mentioned previously. The light-proof performance can be further improved by simply replacing the dye with the above mentioned pigments.

According to another feature of the present invention, a single recording head provides multi-color or full-color printing. Since the recording head of the invention is to effect the application of a solvent instead of a colored ink and the color is determined by the transfer sheet, it is not necessary to provide as many recording heads as there are different colors. Multicolor printing is possible by depositing a solvent in one of two quantum values with a single recording head and transporting a transfer sheet to change colors. Full-color printing is possible by depositing a solvent proportional in quantity to a gray scale input signal.

The recording head shown in FIG. 5 is only capable of ejection of solvent at one of two discrete amounts if it is driven by the pulse-width modulated signal as mentioned above. If full-color recording is desired with the use of the FIG. 5 recording head, a known dithering method is available to modulate the number of droplets to be ejected per unit area in accordance with a gray scale signal.

For high-speed printing, it is essential to accelerate the dissolvability of the colorant with the deposited solvent. The dissolvability is not only determined by the material of the colorant but also by the area of contact between the colorant and a droplet of solvent transferred thereto. It is found that the colorant material tends to alter with time and the dissolvability deteriorates if the transfer sheet is kept in storage for an extended period of time.

An experiment was conducted to evaluate the effect of the resistance heater 3a on the dissolution of the colorant by the solvent using the arrangement of FIG. 3b. In this experiment, a 7-micrometer thick colorant layer was formed by preparing a xylene solution containing a mixture of 75 parts by weight of rosin-modified maleic resin (Beccasite F 266 which softens at about 90° C.) as a binder and 25 parts by weight of magenta solvent dye (C. I. Solvent Red 49) and applying the solution to the surface of a base comprising an orthogonally extended polyethylene terephthalate film with a thickness of about 25 micrometers. The recording head of FIG. 6 is supplied with a transparent solvent which comprises a mixture of n-octyl chloride and 0.4 wt % of polyoxyethylene nonylphenol ether having an HLB value of 141. The solvent so prepared has a boiling temperature of 183° C., and was deposited on an 80-micrometer thick mat-coated paper one hour after the preparation of the colorant transfer sheet at a room temperature of 25° C. A period of about 2 seconds was taken to produce a sharply defined image without heating the resistance heater 3a. For comparison, the resistance 3a was heated so that the surface of the cylinder 3 is maintained at 75° C. The dissolution period was reduced to 0.5 seconds. A similar test was conducted to evaluate the performance of the colorant one month after its preparation. The test showed that it took about ten seconds to effect the dissolution without heating the resistance heater 3a. When the heater was warmed to maintain the cylinder surface at 80° C., the dissolution time was reduced to about 0.5 seconds.

If the colorant layer is not bonded satisfactorily to the base material, the colorant is likely to separate therefrom spontaneously. This problem may be mitigated by providing a corona treatment on the surface of the transfer base or using a foamed polypropylene sheet having a high degree of luster equivalent to that of a pearl (Toyo-pearl-SS available from Toyo Bohseki Kabushi Kaisha). The sheet of this type has microscopic surface irregularities which not only increase the bonding between the colorant and base materials, but prevent the dispersion of deposited solvent and increase the contact area between the deposited solvent and the colorant. The dissolvability of the colorant is improved by the provision of the surface irregularities. Since the dispersion of deposited solvent is prevented, high resolution image printing is also made possible. The dispersion of deposited solvent is effectively prevented by the use of mat-coated paper as a recording sheet. Similar results were obtained by a colorant in which the pigment was used instead of the dye.

A further factor that determines the image density and resolution is the amount of pressure exerted between transfer sheet 4 and recording sheet 5 as well as the uniformity of the pressure over the contact surface. As described previously, the one of the two sheets which is positioned on the outer side of the cylinder 3 is maintained at a high tension than the other. This is accomplished by pulling the outer side sheet in a direction toward the takeup side of the arrangement. For this purpose, a motor 19 is connected to the drive shaft of the cylinder 6b as shown in FIG. 3b to pull the recording sheet 5.

While any one of the embodiments of FIGS. 1, 2, 3a, 3b and 4 are useful for recording multi-color or full-color images, the embodiments of FIGS. 3a and 3b are most preferred for color printing purposes since the misalignment of overlapping colors can be easily corrected optoelectronically. The following is a description of preferred embodiments useful for color printing purposes.

Figure 8:
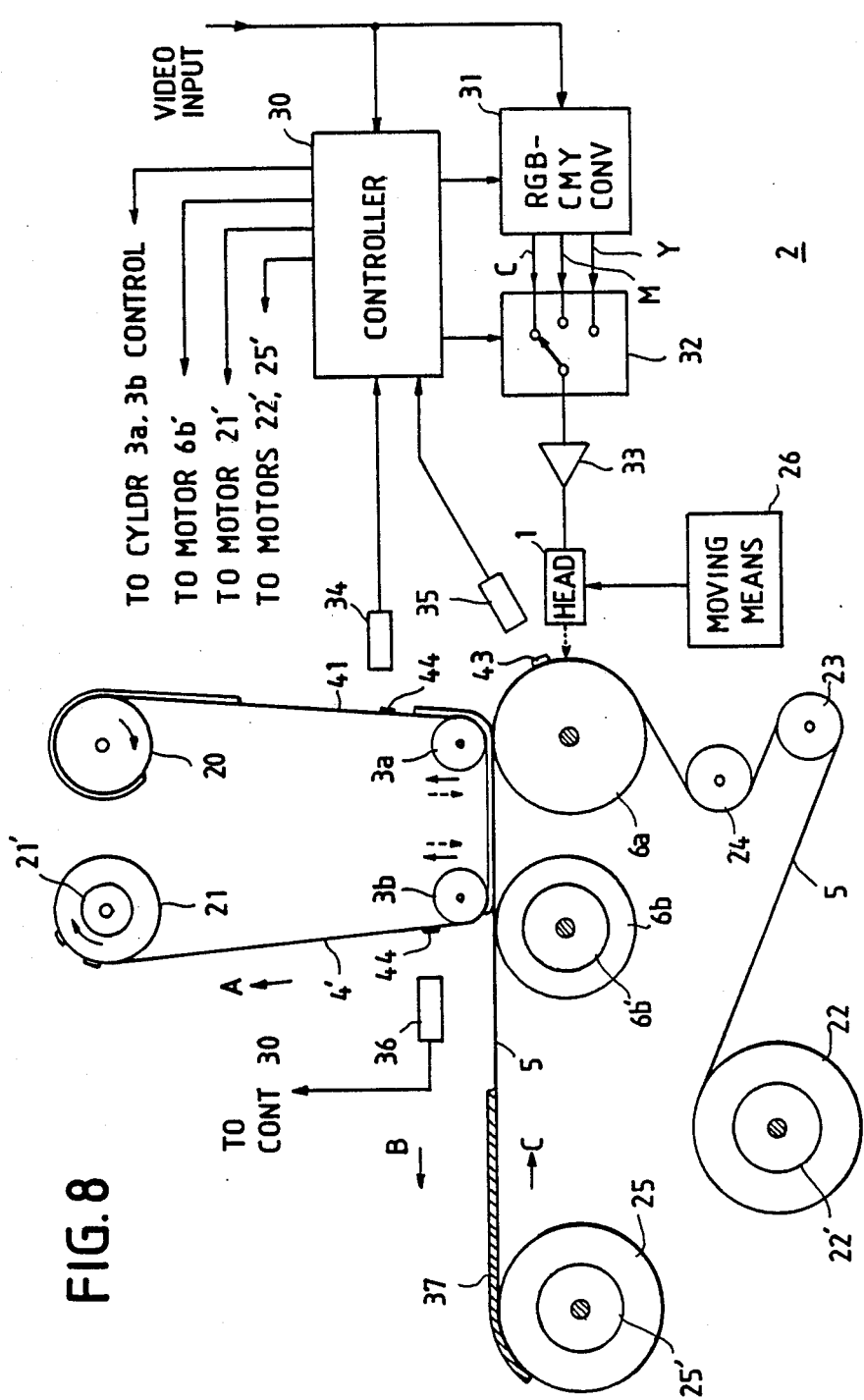
FIG. 8 is an illustration of a further embodiment of the invention useful for multi-color or full-color printing.

In FIG. 8, the sheet drive system is generally similar to that shown in FIG. 3b with the exception that the cylinder 3 is replaced with a pair of cylinders 3a and 3b located adjacent the cylinders 6a and 6b, respectively, to support a section of a transfer sheet 4' in parallel with a corresponding section of the recording sheet 5. The transfer sheet 4' is supplied from a supply spool 20 and taken up by a cylinder 21 which is driven by a motor 21' in clockwise direction. The recording sheet 5, supplied from a supply spool 22, is trained through cylinders 23, 24, 6a, 6b to a takeup spool 25. The supply spool 22 and takeup spool 25 are respectively driven by clutch motors 22' and 25' to take up the sheet 5 during printing and rewind it at a higher speed to the start position to reinitiate printing. The cylinder 6b is provided with a motor 6b' to feed the recording sheet 5 to the takeup spool 25. Cylinders 3a, 3b and spools 20, 21 are mounted on a cylinder carriage, not shown, which is controlled by the controller 30 to move cylinders 3a, 3b in a direction away from cylinders 6a, 6b when sheet 5 is rewound and move them into pressure contact positions during print mode.

Figure 9B:
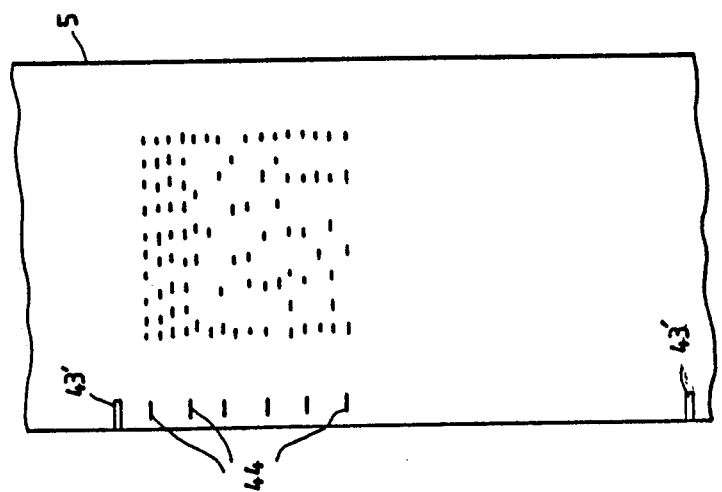
FIG. 9b is a sketch illustrating a portion of the recording medium used in the FIG. 8 embodiment.
Figure 9A:
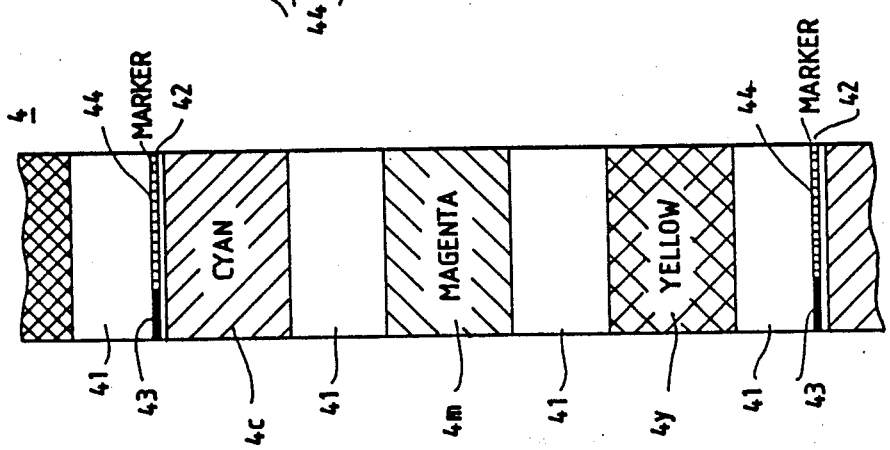
FIG. 9a is an illustration of a transfer sheet used in conjuction with the embodiment of FIG. 8.

As shown in FIG. 9a, colorant transfer sheet 4' is coated with recyclic patterns of colorant layers 4c, 4m, 4y having colors of cyan, magenta and yellow, respectively, which are separated by non-coated portions 41. A marker 42 is printed to indicate the print start position. This marker includes a color transfer portion 43 of a material similar to the colorant and nontransferable portion 44.

Recording head 1 of the electroosmotic type shown in FIG. 6 is mounted on a suitable moving means or carriage 26. This carriage can be dispensed with if the recording head 1 is of the noncontact type as shown in FIG. 5. This carriage moves the head 1 into contact with the recording sheet wound on the cylinder 6a and moves it in a direction away from the sheet 5 when the latter is rewound. Control circuit 2 includes a controller 30, an RGB-to-CMY converter 31, a multiplexer 32, a driver 33, and marker detectors 34 and 35. A composite video signal is applied to the controller 30 and RGB-CMY converter 31. Converter 31 includes an analog-to-digital converter for converting the RGB components into digital form, and a data processor which processes the stored signals in a known algorithm to convert the red, green and blue components to cyan, magenta and yellow components and provides gamma compensation. The converted signals are respectively stored in frame memories. The frame memories are read on a frame-by-frame basis in response to signals from marker detectors 34 and 35. The output of the frame memories is converted to a pulse signal with the duration modulated in pulse duration with the intensity of the individual color and fed to the multiplexer 32.

The motor 21' is initially energized to transport the transfer sheet 4' in the direction of arrow A. This motor remains energized until a full-color print cycle ends. When the transfer sheet comes to a start position, the marker detector 34 detects a marker 44 and notifies the controller 30 to control the multiplexer 32 and the head carriage 26. The recording head is moved to the working position and the cyan signal is fed to the head 1 via driver 33 to start depositing solvent on the recording sheet. At the same time, cylinders 3a, 3b are moved to the working positions, and motors 6b' and 25' are energized to transport the recording sheet 5 in the direction of arrow B. The feed motor 6b' is driven by pulses derived from vertical sync pulses of the composite video signal.

Solvent is thus deposited on the recording sheet in response to the "cyan" signal and advanced to the dissolving area where it contacts with the cyan-colored portion 4c of the colorant layer to transfer a cyan-colored print on the recording sheet. After the deposition of solvent for a full frame of the cyan signal is complete, the motors 25' and 6b' remain energized until the end portion of the deposited solvent moves past the cylinder 3b. For this reason, a third marker detector 36 is provided to detect when the non-transferable marker 44 leaves the downstream side cylinder 3b. The cylinder carriage is moved so that cylinders 3a and 3b are then disengaged from contact with cylinders 6a, 6b. Clutch motor 22' is energized to rewind the recording sheet in the direction of arrow C.

The marker 43 is formed of a material which can be transferred upon contact to the recording sheet without being dissolved with the solvent. Thus, a marker 43' is transferred to the recording sheet as shown in FIG. 9b and detected by the marker detector 35 during this rewind mode. The controller 30 responds to it by deenergizing the motor 22'. The multiplexer 32 is switched to couple the magenta signal to the recording head and cylinders 3a and 3b are brought into working positions again, with the motors 6b', 25' being energized again.

The above process is repeated to record a print of magenta and yellow colors in overlapping relation with the print of cyan, as shown at 37.

Each of the non-coated portions of the transfer sheet 4' has a longitudinal dimension sufficient to allow the solvent to travel the distance from the nozzle opening to the downstream side cylinder 3b. The effect of these non-coated portions is to prevent transfer of colorant to undesired portions of the recording sheet.

In a preferred embodiment, a plurality of markers 44 are transferred from the transfer sheet to an edge portion of the recording sheet or printed by a suitable means as shown in FIG. 9b is positions corresponding to each or a plurality of horizontal print lines. These markers are detected by marker detector 35 during rewind modes to accurately control the speed of the feed motor 6b' to align the recording sheet with the transfer sheet to thereby prevent misalignment between overlapping color images. This arrangement is particularly advantageous in that it can compensate for the longitudinal expansion and contraction of the recording sheet which might occur during print operation.

Figure 10:
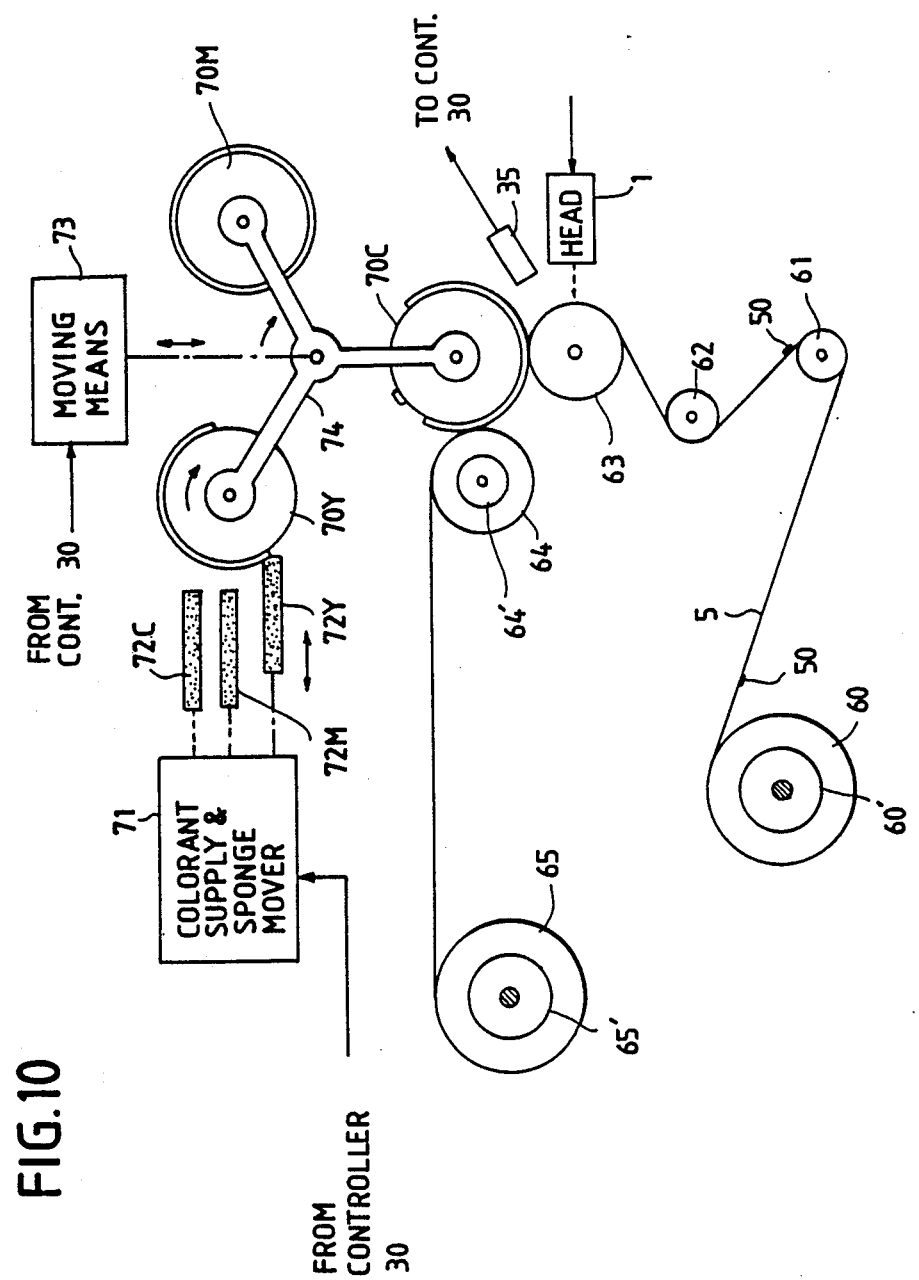
FIG. 10 is an illustration of a modification of the FIG. 8 embodiment.

FIG. 10 is an illustration of another embodiment for full-color printing. This embodiment is basically similar to that shown in FIG. 4. The recording sheet 5 is looped around a supply spool 60, cylinders 61, 62, 63, 64 and a takeup spool 65. This recording sheet is of a type which is printed with markers 50 at longitudinally spaced apart positions. Transfer drums 70C, 70M and 70Y of the construction identical to the transfer drum 14, FIG. 4, are rotatably mounted on shafts of a Y-shaped support 74 at 120 degrees apart. The circumference of each transfer drum equals the length of the frame of print image. The drum support 74 is mounted on a moving mechanism 73 which is controlled by controller 30, FIG. 8. The drums are moved to a downward, working position so that one of the drums is brought into contact with cylinders 63 and 64 to effect printing of a given color and are moved to an upward position where they are rotated clockwise by 120 degrees so that they come into contact in succession with one of the colorant applying sponges 72C, 72M and 72Y.

A colorant supply and sponge moving means 71 is provided to supply cyan, magenta and yellow liquid colorants of the quick dry type to sponges 72C, 72M and 72Y respectively and control the positions of these sponges in response to a control signal from the controller 30. When the cyan transfer drum 70C is in the downward position, the yellow transfer drum 70Y is in contact with the yellow sponge 72Y to apply a new coat of yellow colorant liquid on the circumference of the drum 70Y. For this purpose, the moving means 73 includes a drive that causes each drum to turn a full clockwise revolution while in contact with the end of the associated sponge, and the sponge moving means 71 retracts the sponge from the surface of this drum. This new coat will be dried before the drum 70Y comes to the working position in the next print cycle.

Spools 60 and 65 are respectively driven by clutch motors 60' and 65' and cylinder 64 is driven by a pulse motor 64' as in the FIG. 8 embodiment. As in the previous embodiment, motors 64' and 65' are energized to feed the recording sheet to the takeup spool 65 and the recording head is driven by a pulse-width modulated signal to deposit a solvent to record a print of cyan-colored image. At the end of the cyan print, motors 64' and 65' are deenergized, the drums are moved upward and motor 60' is energized to rewind the recording sheet until a marker 50 is detected by marker detector 35 which signals the controller 30 to stop the motor 60'. During this rewind mode, the cyan drum 70C is rotated to the position where it is applied with a new coat and the magenta drum 70M comes to the downward position. When the marker 50 is detected, the drums are lowered so that the drum 70M contacts the recording sheet against cylinders 63 and 64. Motors 64' and 65' are reenergized to print a magenta image on the printed cyan image. The same process is repeated to print a yellow image. An advantage of this embodiment is that it permits the colorant to be used fresh from the coating process, and therefore the dissolution characteristic of the colorant can be fully exploited before it deteriorates significantly.

In an alternative embodiment, solid-phase colorants containing Beccasite F-266 or Nisseki Neopolymer 120 are used instead of the sponges 72C, 72M and 72Y to dispense with the quick-dry type liquid colorants. Each of the transfer drums 70 comprises a metal surface cylinder having a resistance heater therein to heat the surface at a temperature slightly higher than the melting point of the solid-phase colorant during the coating process. The solid-phase colorant melts upon contact with the heated surface of the transfer drums and a new coat of colorant is applied over the circumference of the drums in succession. The applied coat is allowed to dry sufficiently before it contacts the recording sheet. This alternative embodiment is advantageous for high speed printing.

Figure 11:
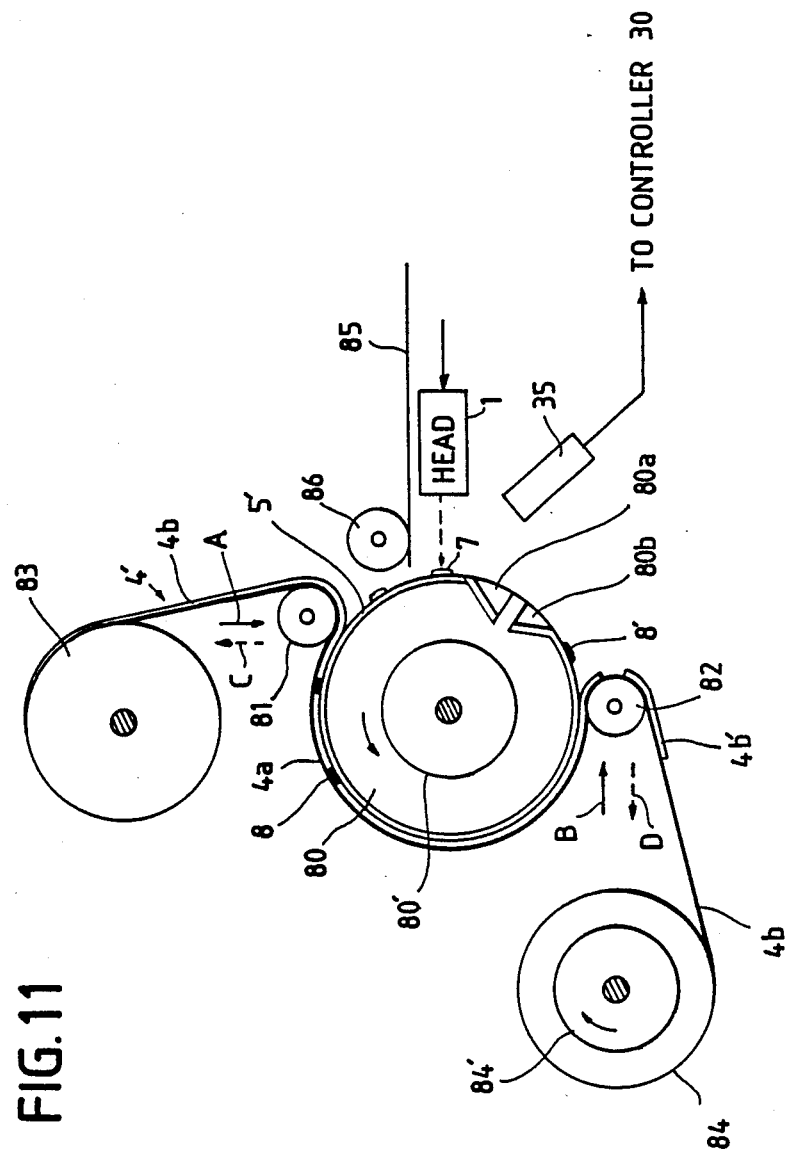
FIG. 11 is an illustration of an embodiment for multi- or full-color printing useful for precut sheets.

FIG. 11 is a further embodiment of the present invention in which precut recording sheets are used instead of the rolled sheet of the previous embodiments for printing full-color images. A precut sheet 5" is fed from a feeding plate 85 by a rubber coated cylinder 86 to a cylinder or platen 80 having a pair of paper locking mechanisms 80a and 80b to hold the ends of the sheet 5" in position. The sheet 5" is wrapped around the circumference of the platen. The platen 80 is driven by a reversible motor 80' counterclockwise during print modes and clockwise when sheet 5" is withdrawn from the cylinder 80. As shown is FIG. 12, the colorant transfer sheet 4" is coated with recyclic patterns of closely spaced regions of colorant having cyan, magenta and yellow colors with each pattern being separated by uncoated portions 46 from adjacent patterns. A transferable marker 47 is printed in each uncoated region. The longitudinal dimension of each colorant region is equal to or greater than the circumference of the cylinder 80, which circumference is in turn equal to or greater than the longitudinal dimension of the print image. Likewise, the longitudinal dimension of each uncoated portion is preferably equal to or greater than the circumference of the platen 80 to prevent undesirable transferrence of the colorant which is still wet immediately after printing to the recording sheet. Transfer sheet 4" is rolled at one end to a supply spool 83 and at the other end to a takeup spool 84 which is driven by a motor 84' and trained through cylinders 80, 81 and 82. The cylinders 81 and 82 are secured to a suitable moving mechanism which moves the cylinders 81 and 82 in the directions of arrows A and B to a working position to press the transfer sheet 4" against the cylinder 80 during the print mode and moves them in the directions of arrows C and D when the cylinder 80 rotates clockwise.

Motor 80' is driven counterclockwise to transfer a marker 47 from transfer sheet 4" with the cylinders 81 and 82 being in pressure contact with the platen 80. This marker is detected by detector 35 to cause the controller to generate start timing signals which allow a pulse-width modulated signal to be applied to recording head 1. Solvent 7 is deposited on sheet 5" wrapped around cylinder 80 in succession in response to cyan, magenta and yellow signals to provide overlapped color prints on the recording sheet 5". As in the previous embodiment, a resistance heater is preferably provided in the platen 80 to accelerate dissolving process.

Figure 12:
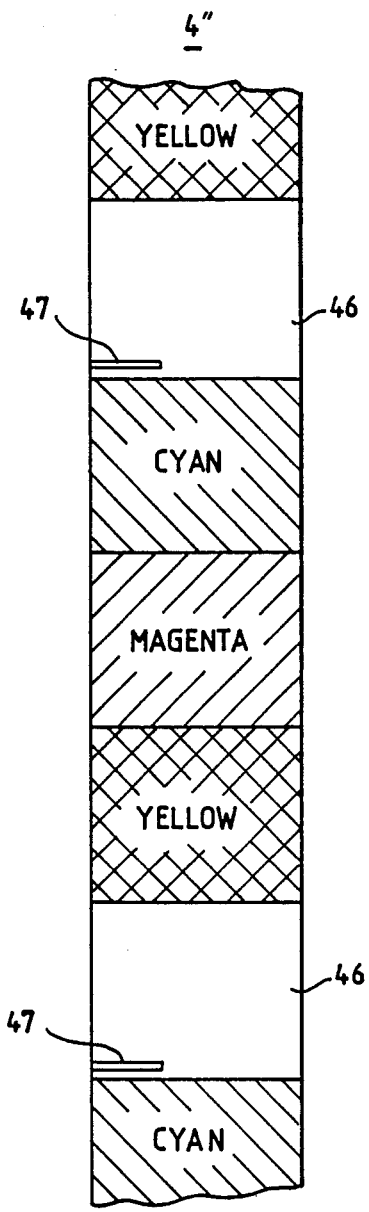
FIG. 12 is an illustration of a transfer sheet used in the FIG. 11 embodiment.

By comparison between FIGS. 9a and 12 it is seen that the embodiment of FIG. 11 permits greater utilization of transfer base material than the FIG. 8 embodiment due to the closely spaced arrangement of coated colorants.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A method for printing ink on a recording medium comprising:
    (a) applying a fresh layer of colorant to the surface of a first drum;
    (b) selectively depositing a liquid solvent on a second drum, the circumferential surface of which contacts the surface of said colorant layer, said liquid solvent being deposited on said second drum in response to an electrical signal representing the density of a picture element, said solvent comprising a material which dissolves at least one embodiment of said colorant layer;
    (c) rotating said first and second drums so that the deposited liquid solvent contacts and dissolves a portion of the colorant layer; and
    (d) successively contacting a portion of the recording medium with said portion of the colorant layer to transfer said portion of the colorant layer from said first drum to said recording medium.

2. A method as claimed in claim 1, further comprising heating said portion of the colorant layer at a temperature which is lower than the temperature at which said colorant layer becomes transferable to said recording medium without being dissolved with said solvent and which is lower than the boiling point of said solvent.

3. Apparatus for printing ink on a recording medium comprising:
    a first rotary drum;
    means for applying a layer of colorant on the circumference of said first drum;
    a second rotary drum, the circumferential surface of which contacts the surface of said colorant layer;
    means for selectively depositing a solvent on a portion of said second drum in response to an electrical signal representing the density of a picture element, said solvent comprising a material which dissolves at least one constituent of said colorant layer;

means for rotating said first and second drums so that the deposited liquid solvent contacts and dissolves a portion of the colorant layer; and means for feeding said recording medium in nonslidable contact with said portion of the colorant layer to cause said portion of the colorant layer to be transferred from said drum to said recording medium.

4. Apparatus as claimed in claim 3, wherein said first drum includes means for heating said colorant layer at a temperature which is lower than the temperature at which said colorant layer becomes transferable to said recording medium without being dissolved with said solvent and which is lower than the boiling point of said solvent.

* * * * *